United States Patent
Peresada et al.

(10) Patent No.: US 7,231,822 B2
(45) Date of Patent: Jun. 19, 2007

(54) MACHINE AND METHOD FOR BALANCING A MEMBER DURING ROTATION

(75) Inventors: Gary L. Peresada, Torrington, CT (US); Christopher E. Emr, Torrington, CT (US); Russel H. Marvin, Goshen, CT (US)

(73) Assignee: The Bergquist Torrington Company, Torrington, CT (US)

(*) Notice: Subject to any disclaimer, the term of this patent is extended or adjusted under 35 U.S.C. 154(b) by 72 days.

(21) Appl. No.: 10/788,106

(22) Filed: Feb. 25, 2004

(65) Prior Publication Data
US 2005/0193886 A1    Sep. 8, 2005

(51) Int. Cl.
*G01M 1/16*    (2006.01)
(52) U.S. Cl. .............. 73/462; 89/1.14; 42/97; 124/45
(58) Field of Classification Search ........... 73/66; 124/77, 44.6, 45; 89/1.14; 42/97
See application file for complete search history.

(56) References Cited

U.S. PATENT DOCUMENTS

| | | | | |
|---|---|---|---|---|
| 2,432,659 A * | 12/1947 | Criswell | ............ | 118/669 |
| 2,937,613 A * | 5/1960 | Larsh | ............ | 118/669 |
| 3,130,075 A * | 4/1964 | Larsh | ............ | 118/669 |
| 3,913,554 A * | 10/1975 | Pitcher | ............ | 124/67 |
| 3,996,883 A * | 12/1976 | Gusarov et al. | ............ | 118/669 |
| 4,998,448 A * | 3/1991 | Ellis, Jr. | ............ | 464/180 |
| 5,046,361 A * | 9/1991 | Sandstrom | ............ | 73/460 |
| 5,063,905 A * | 11/1991 | Farrell | ............ | 124/72 |
| 5,067,349 A * | 11/1991 | Hirchert | ............ | 73/472 |
| 5,201,248 A * | 4/1993 | Ibe et al. | ............ | 310/261 |
| 5,845,542 A * | 12/1998 | Hannah et al. | ............ | 74/570.2 |
| 5,947,100 A * | 9/1999 | Anderson | ............ | 124/45 |
| 5,992,232 A * | 11/1999 | Saitoh | ............ | 73/468 |
| 6,626,165 B1 * | 9/2003 | Bhogal | ............ | 124/77 |
| 6,634,255 B2 * | 10/2003 | Trionfetti | ............ | 464/68.41 |
| 2002/0148518 A1 * | 10/2002 | Lindler et al. | ............ | 137/625.65 |

* cited by examiner

*Primary Examiner*—Hezron Williams
*Assistant Examiner*—Samir M. Shah
(74) *Attorney, Agent, or Firm*—Haugen Law Firm PLLP

(57) ABSTRACT

A machine for balancing a rotating member includes hard bearing balancing apparatus for determining the magnitude and circumaxial location of imbalance. A sensor responds to the position of the rotating member. A computer receives signals from the balancing apparatus and the sensor and determines the location of one or more projectiles to be fired at the member. A firing mechanism including a piezoelectric actuator fires the projectiles in timed relationship with the rotation of the member so as to position the projectiles as required for balancing.

2 Claims, 2 Drawing Sheets

MACHINE AND METHOD FOR BALANCING A MEMBER DURING ROTATION

BACKGROUND OF THE INVENTION

Attempts to balance members during rotation have not been commercially successful in the past. Accordingly, it is the general object of the present invention to provide a machine for balancing a member during rotation in a procedure much more expeditious and at least as accurate as manual balancing and which is highly efficient and reliable over a long service life.

RELATED APPLICATIONS

The filing date of Provisional Application entitled Method and Apparatus for Balancing Fan and Blower Assemblies filed Jan. 9, 2004 is hereby claimed for the present application and the Provision Application is hereby incorporated herein by reference.

U.S. Patent Application entitled A Rotatable Member with an Annular Groove for Dynamic Balancing During Rotation filed Jan. 9, 2004 is hereby incorporated herein by reference.

SUMMARY OF THE INVENTION

In fulfillment of the aforementioned object and in accordance with the present invention, a machine for balancing a rotating member comprises apparatus for determining the magnitude and the circumaxial location of the imbalance of the member. A sensor responsive to the position of reference mark on the rotating member is also provided together with at least one balancing projectile of known weight. A computer is connected with and receives signals from the first mentioned apparatus and the sensor and determines the location of one or more projectiles to be fired at the member in timed relationship with rotation of the member whereby to balance the same within a specified tolerance. A fast acting firing mechanism comprises an electrical-mechanical transducer assembly with a reaction time compatible with the speed of rotation of the rotating member is operated by the computer to fire a projectile at the member at the circumaxial location determined by the computer. The balancing machine of the invention is compatible with rotational speeds of a member to be balanced in both lower speed ranges below 1000 R.P.M. as well as higher speeds at least up to 5000 R.P.M.

Operation at high speed and with a high degree of accuracy, as much as five times that achieved manually, is attributable at least in part to the use of a piezoelectric stack as a transducer-actuator for receiving an electrical signal from the computer and rapidly converting to a mechanical signal for triggering a momentary valve which releases an explosive burst of air for propelling a projectile toward the rotating member. While it is anticipated that future piezoelectric stack actuators with enhanced output characteristics will accommodate system designs wherein the actuator directly triggers a momentary valve, or perhaps employs a motion amplifier along, the presently preferred design includes a motion amplifier in the form of a lever and a force amplifier in the form of a stored energy device operated by the lever. A loading mechanism operable in timed relationship with the firing mechanism includes a shuttle movable from a loading position to a firing position and which has a chamber for receiving and transporting projectiles and for positioning projectiles to be propelled by the explosive burst of air mentioned above. In the firing position of the shuttle, a through opening communicating with the chamber is open at one end to the momentary valve for receipt of the burst of air and that other end for the discharge of projectiles toward the rotating member. A magnet in the shuttle forms a means for retaining projectiles in position in the chamber during transfer and prior to discharge.

A vibratory feeder and supply tube deliver projectiles to the loading mechanism at the loading position.

Finally, the method of the invention comprises the steps of determining the location of imbalance of a rotating member, calculating the amount and position of balancing weight required to balance the member, calculating the time to fire based on speed of rotation and total firing time, and firing one or more projectiles as required at the member to balance the same.

When the weight required to balance a rotating member is not an integral number of projectiles, the method requires a further determination of two or more locations which are spaced circumaxially from the point of imbalance but which will balance the member. Projectiles are then fired at these locations.

The aforementioned condition may occur when less than a single projectile is required at the point of imbalance or when a first integral projectile is required at the point of imbalance with additional projectiles required at spaced circumaxial positions for an additional non-integral correction.

DESCRIPTION OF THE PREFERRED EMBODIMENT

Figure 1:
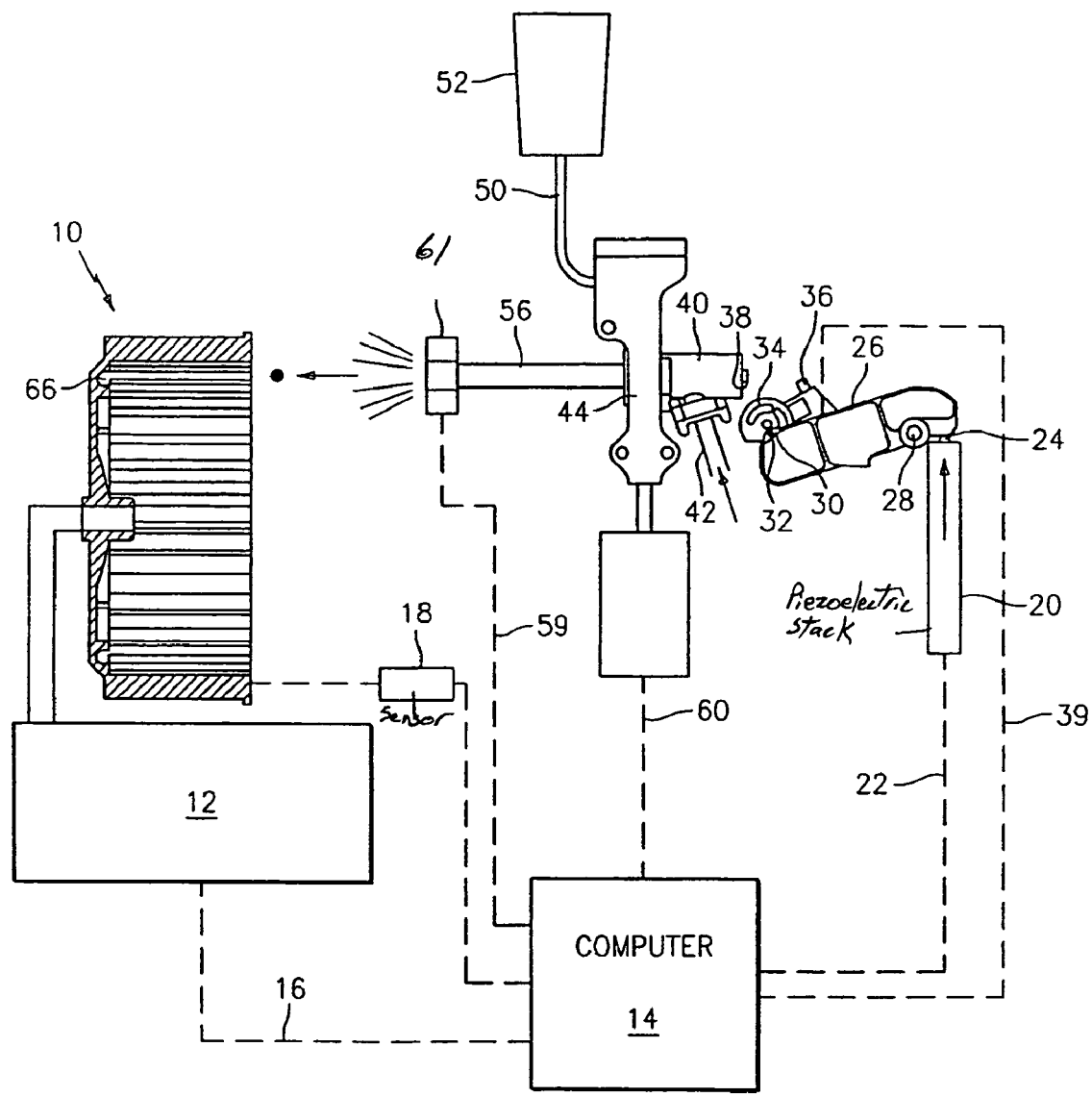
FIG. 1 of the drawings is a schematic view of the balancing machine of the present invention.

Referring initially to FIG. 1, it will be observed that a member to be balanced takes the form of a centrifugal air impeller indicated generally at 10. The impeller 10 is mounted on a conventional apparatus known as a hard bearing balancing machine. Various machines may be employed with a SCHENCK machine presently preferred. The impeller shown is rotated at a constant speed of approximately 1700 R.P.M. but the balancing machine of the invention can accommodate rotational speeds from the low hundred to at least 5000 R.P.M. The balancing machine 12 responds to unbalanced forces and reports to a computer 14 via broken line 16 advising as to the magnitude and circumaxial location of imbalance of the impeller 10. Sensor 18, preferably a diffuse laser sensor, responds to instantaneous position of the impeller which is provided with a reference mark legible to the sensor and advises the computer accordingly.

The computer 14 employing the information from the balancing apparatus and the sensor, and considering the known weight of the balance projectiles, calculates the required number of projectiles and their respective circumaxial locations to balance the rotating member. The computer thus determines the precise instant in time to send a signal 22 to piezoelectric stack transducer-actuator 20 to discharge a projectile so that it will engage the rotating member at the desired location. All time lags resulting from operation of the piezoelectric stack and other elements to be described below are considered by the computer with precise positioning of the projectile resulting. An appropriately programmed computer should be of a high-speed type but may be conventional.

The piezoelectric transducer-actuator stack 20 has an exceptionally high reaction time.

Mechanical output element 24 of the actuator 20 is operatively associated with the right hand end of lever 26 in FIG. 1 which has a pivot point 28 providing for amplification of the output movement of the element 24. At its left hand end, the lever 26 has a small detent 30 engaging a pin 32 on a spring-loaded striker 34 shown in FIG. 1 in an armed or cocked position. The striker 34 serves as a force amplification means and carries a small pin 36 which engages a trigger pin 38 on a momentary valve 40 when the detent 30 is pivoted downwardly slightly releasing the pin 32 and permitting the striker to rotate in a counter-clockwise direction. The striker 34 is returned to its armed position by a small pneumatic rotary actuator, not shown, but which is connected to and operated by the computer 14 by broken line 39.

Figure 2:
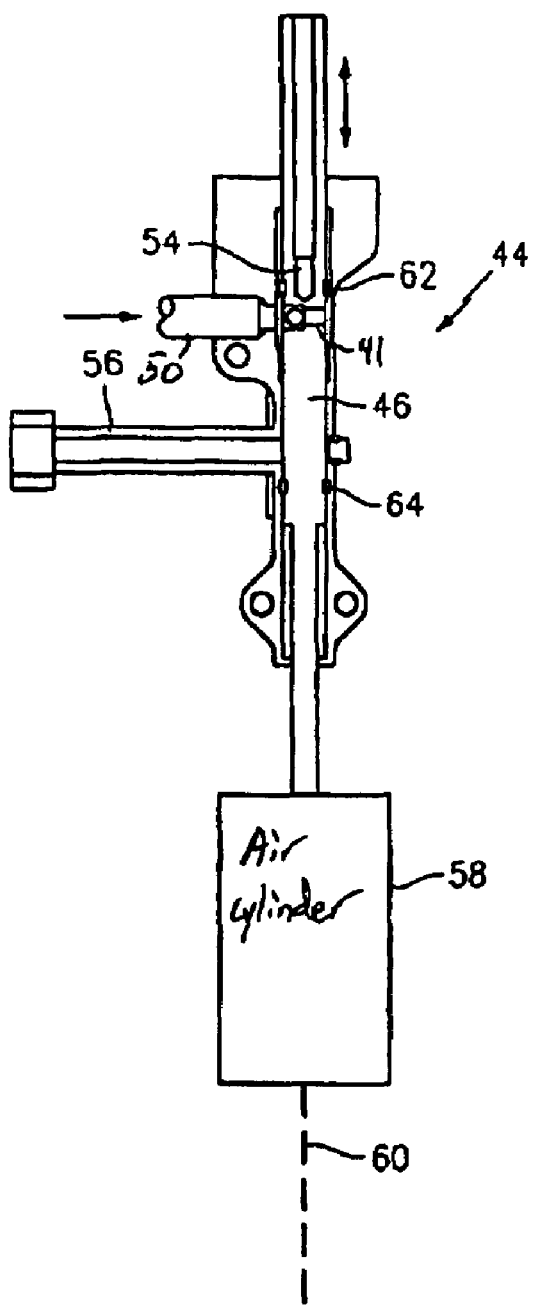
FIG. 2 is a schematic view of the loading mechanism of the invention.
Figure 3:
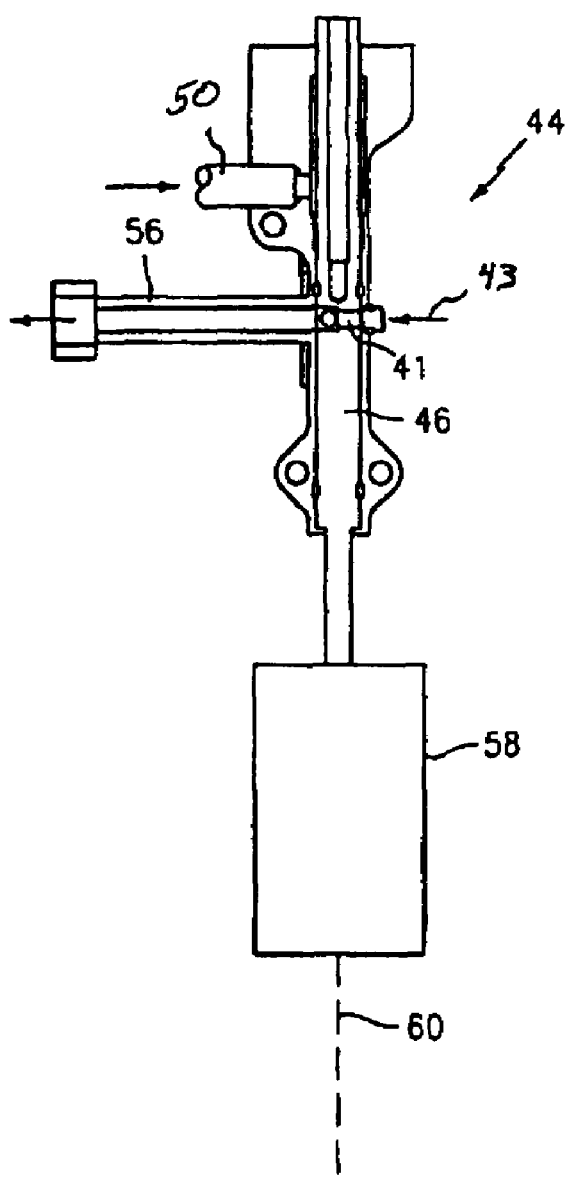
FIG. 3 is a schematic view of the loading mechanism of the invention.

Momentary valve 40 which may be conventional serves to release an explosive burst of air to a firing chamber 41 in a loading mechanism 44 best illustrated in FIGS. 2 and 3. Supply conduit 42 extending from the valve communicates with a source of air under pressure.

Referring now more particularly to the loading mechanism 44 in the left and right hand views in FIGS. 2 and 3, a shuttle 46 moves between loading and firing positions illustrated respectively in the left and right hand views in FIGS. 2 and 3. In FIG. 2, with the shuttle in the loading position, a projectile is shown in the shuttle chamber 41 having been delivered by a tube 50, FIG. 1, which extends from a vibratory feeder 52. A magnet 54 holds the projectile in position in the chamber, it being noted that a right portion of the chamber is somewhat smaller than a left hand portion thereof with the projectile approximately fitting the said left hand portion. It should also be noted that the chamber has a through opening which communicates with the supply tube 50 at the left in FIG. 2 and with a projectile discharge barrel 56 in FIG. 3. Further in FIG. 3, the chamber 41 communicates at the right with the valve 40, not shown, for receipt of the burst of air as aforesaid.

Air cylinder 58 transfers the shuttle 46 between loading and firing positions under the control of the computer 14 via broken line 60. As mentioned, projectiles are delivered to the chamber 41 and are held in position by magnet 54. The projectiles are preferably metallic and at the present time small bearings or BB's of the type used in a powered BB gun may be used. The weight of the projectiles is of course determined and entered in the computer memory.

As the shuttle is moved downwardly to its firing position the chamber 41 is sealed by small annular seals 62 and 64 respectively above and below the chamber which cooperate with a slightly tapered housing opening in which the shuttle slides. Thus, at the firing position of FIG. 3, the chamber 41 is conditioned to receive the air burst 43 from the valve 40 whereupon the projectile therein is propelled toward the impeller 10, FIG. 1. Exit sensor 61 reports successful firings to the computer 14 via broken line 59 and may be employed to determine the response time of the firing mechanism.

On reaching the impeller 10, the projectile is captured and retained in position by an annular groove 66 best shown in FIG. 1 and more fully described and illustrated in the above-mentioned U.S. Application.

From the foregoing it will be apparent that the balancing machine of the present invention as a whole has an exceptionally fast reaction time, due in large part to the incorporation of the piezoelectric actuator, as well as extremely high accuracy characteristics, this due at least in part to the incorporation of a high speed computer. The total time in balancing a rotating member with the machine of the present invention may be as little as one tenth that required in a manual balancing procedure. It is also to be noted, as mentioned above, that the accuracy balancing achieved with the machine may be as high as five times that realized in manual balancing.

The invention claimed is:

1. A machine for balancing a member during rotation at speeds up to 5000 RPM; said machine comprising:
   (a) apparatus for determining the magnitude and the location circumaxially of an imbalance of the member;
   (b) a sensor responsive to the position of the rotating member;
   (c) a supply of metallic balancing projectiles of a known weight;
   (d) a computer connected with and receiving signals from said apparatus and sensor and determining the desired location circumaxially on the member for at least one balancing projectile to be fired at the member in timed relationship with the rotation of the member whereby to balance the same;
   (e) a fast response firing mechanism comprising a piezoelectric stack and a motion amplifier responsive to the computer to fire a projectile at the member to satisfy the need for a balancing weight at the computer-determined circumaxial location; and
   (f) a loading mechanism operable in timed relationship with the firing mechanism to feed projectiles to the latter seriatim, said mechanism including a shuttle movable between loading and firing positions in timed relationship with the firing mechanism, said shuttle including a magnet for successively grasping projectiles at the loading position and positioning the same for firing at the firing position.

2. A balancing machine as set forth in claim 1 wherein the firing mechanism includes a device which provides an explosive burst of air for firing projectiles.

* * * * *